(12) United States Patent
Seon

(10) Patent No.: US 6,501,959 B1
(45) Date of Patent: Dec. 31, 2002

(54) METHOD FOR CONTROLLING FORWARD CALLS BY PREDETERMINING THE TRANSMISSION POWER IN THE BASE STATION OF A CELLULAR RADIO TELECOMMUNICATION SYSTEM

(75) Inventor: Yong-Moon Seon, Songnam-shi (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/542,548

(22) Filed: Apr. 3, 2000

(30) Foreign Application Priority Data

Apr. 3, 1999 (KR) .............................. 99-11719

(51) Int. Cl.$^7$ ................................. H04B 7/00
(52) U.S. Cl. ................. 455/522; 455/69; 455/423; 370/332
(58) Field of Search .................. 455/522, 69, 423, 455/424, 425, 436, 439, 442, 67.1, 403, 115, 126; 370/331, 332

(56) References Cited

U.S. PATENT DOCUMENTS

| | | | | |
|---|---|---|---|---|
| 5,471,649 A | * | 11/1995 | Rees et al. .................. 455/115 |
| 5,570,373 A | * | 10/1996 | Wing .......................... 370/241 |
| 5,862,460 A | * | 1/1999 | Rich ........................... 330/279 |
| 5,862,461 A | * | 1/1999 | Yoshizawa et al. ..... 330/124 R |
| 5,943,610 A | * | 8/1999 | Endo ........................... 455/456 |
| 5,946,612 A | * | 8/1999 | Johansson .................... 455/405 |
| 6,173,163 B1 | * | 1/2001 | Northcutt .................... 455/115 |
| 6,278,879 B1 | * | 8/2001 | Western et al. ............. 455/522 |
| 6,286,994 B1 | * | 9/2001 | Boesel et al. ............... 374/146 |
| 6,308,065 B1 | * | 10/2001 | Molinari et al. ............ 455/423 |
| 6,374,116 B1 | * | 4/2002 | Peterzell et al. ............ 455/115 |
| 6,418,322 B1 | * | 7/2002 | Kim et al. ................... 455/442 |

* cited by examiner

Primary Examiner—Lee Nguyen
Assistant Examiner—Congvan Tran
(74) Attorney, Agent, or Firm—Steve Cha; Cha & Reiter

(57) ABSTRACT

A method for controlling the forward calls in a cellular radio telecommunication system, comprising the steps of: reading the transmission power of the BS measured by the BTU; comparing the transmission power with a first predetermined threshold value; storing the transmission power if the transmission power is higher than the first predetermined threshold value; calculating the digital gain power by using the digital gain assigned to a call to the BS; calculating the total transmission power of the BS according to the call by adding the read transmission power to the calculated digital gain power; and, limiting the call in response to the determination of comparing the total transmission power with a second predetermined threshold value.

26 Claims, 4 Drawing Sheets

METHOD FOR CONTROLLING FORWARD CALLS BY PREDETERMINING THE TRANSMISSION POWER IN THE BASE STATION OF A CELLULAR RADIO TELECOMMUNICATION SYSTEM

CLAIM OF PRIORITY

This application makes reference to and claims all benefits accruing under 35 U.S.C. Section 119 from an application for METHOD FOR CONTROLLING THE FORWARD CALLS AND DETERMINING THE TRANSMISSION POWER IN A BASE STATION OF A CELLULAR RADIO TELECOMMUNICATION SYSTEM filed earlier in the Korean Industrial Property Office on Apr. 3, 1999 and there duly assigned Serial No. 11719/1999.

BACKGROUND OF THE INVENTION

1. Field of the Invention

The present invention relates to a cellular radio telecommunication system, and more particularly to a method for controlling forward calls with a predetermined transmission power.

2. Description of the related art

In a cellular radio communication system, a geographical area, e.g., a metropolitan area, is divided into several smaller, contiguous radio coverage areas known as "cells." Each cell is served by a fixed radio station known as "base station." The base stations are connected to and controlled by a mobile service switching center (MSC), which communicates voice and/or data signals with the mobile phones. The forward channel (from the base station to the mobile phone) is divided into a traffic channel for transmitting voice data and an overhead channel for transmitting control data.

As shown in FIG. 1, a conventional base station (BS) includes an Intermediate Frequency (IF) modulator 110 for modulating the transmitted signal of each channel into an IF signal; a frequency-up converter 120 for converting the IF signal into a radio frequency (RF) signal; a radio frequency unit (RFU) 130 for amplifying the RF signal and for eliminating unwanted waves; an antenna 140 for transmitting the RF signal; and, a base station control processor (BCP) 150 for controlling the overall function of the base station. The base station (BS) provides each call with a traffic channel to exchange voice and data signals.

The forward overhead channel serves to transmit the messages necessary for preparing the communication channel between the mobile station (MS) and the base station (BS) using almost a constant output power. However, the output power of the entire traffic channels of the BS relates to the number of calls processed for transmitting different voice messages. The number of calls that can be simultaneously processed by the BS is determined by the BS control processor 150.

Each traffic channel of the base station is assigned to a specific transmission power. Thus, if the BS simultaneously receives an excessive number of calls, its total transmission power exceeds the proper limit of the system, causing the high power amplifier (HPA) of the RFU 130 to malfunction. Namely, the overflow causes nonlinear distortion in the HPA that degrades the communication quality of the BS and causes call interruption.

In order to resolve above problem, one conventional method measures the total transmission power of the BS by detecting the signal just prior to transmission through the antenna 140 with a BS test unit (BTU) 160. Then, the measured power is compared to a predetermined threshold value in determining whether to limit the calls. If the total transmission power is higher than the predetermined threshold value, the BS limits the calls generated thereafter. Thus, a reliable performance of the BTU 160 can yield an accurate determination in limiting the correct number of calls. For example, the forward measuring error of the BTU 160 may result in an inaccurate measurement of the transmission power that is lower than the actual value, causing inaccurate determination in limiting the calls by the base station. Also, as the BTU 160 successively measures the transmission power for each of the frequency channels provided in the base station (BS), the time required to measure the total transmission power is prolonged, further causing the problem of determining the accurate number of calls to limit during the system overload.

Another conventional method employs a call admission control (CAC) method to predetermine the total transmission power of the BS based on the transmission power of each channel generated from the IF modulator 110 in order to eliminate the measuring error of the BTU 160. In the transmission path of the BS arranged as shown in FIG. 1, the power level generated from the IF modulator 110 is determined by the digital gain (D/G) of each channel, so that the total transmission power of the BS can be determined by summing up all digital gain (D/G) for each channel. As the D/G is assigned to each call requested through the BS, the power obtained by the D/G of the channel represents the power assigned to the corresponding call in the IF modulator 110. However, this method also falls short of determining an accurate transmission power value due to the error associated with the BTU. That is, there is till error associated with the BTU 160 as the output power of the IF modulator 110 obtained by the D/G must flow through the frequency-up converter 120 and the RFU 130, causing some error in measuring the total transmission power by the BTU 160.

SUMMARY OF THE INVENTION

It is an object of the present invention to provide a method for controlling the forward calls according to the transmission power which is predetermined based on the measured value of the BTU and the D/G of the IF modulator in a cellular radio system.

It is another object of the present invention to provide a method for controlling the forward calls according to a predetermined transmission power which compensates the error occurring in the radio frequency path and which is stored in the base station testing unit (BTU) in a cellular radio system.

According to the embodiment of the present invention, a method for controlling the forward calls in a cellular radio telecommunication system includes the steps of: reading the transmission power of the BS measured by the BTU; comparing the transmission power with a first predetermined threshold value; storing the transmission power if the read transmission power is higher than the first predetermined threshold value; calculating the digital gain power using the digital gain assigned to a call to the BS; calculating the total transmission power of the BS according to the call by adding the stored transmission power to the calculated digital gain power; and, limiting the call in response to the determination of comparing the total transmission power with a second predetermined threshold value.

According to another aspect of the present invention, a method for controlling the forward calls in a cellular radio telecommunication system, comprising the steps of: reading the transmission power error occurring in the radio frequency path from the BTU of the BS; calculating the digital gain power using the digital gain assigned to a call to the BS; calculating the total transmission power of the BS according to the call by adding the read transmission power to the calculated digital gain power; and, limiting the call in response to the determination of comparing the total transmission power with a predetermined threshold value.

In order to control the forward calls of the BS in a cellular system, the first aspect of the present invention is to store the transmission power if it exceeds the first predetermined threshold value, then the stored transmission power is added to the digital gain power calculated by the D/G assigned to a newly generated call in order to produce the total transmission power of the BS.

A second aspect of the present invention is to store the error power occurring in the radio frequency path (RFU) into the BTU and to add the stored error power to the digital gain power calculated by the D/G assigned to a newly generated call to produce the total transmission power of the BS. To this end, the BTU first detects the signal before flowing into the radio frequency path, and then detects the signal flowing out of the radio frequency path or flowing just before entering the transmission antenna. Thus, the two detected signals are compared to determine the error power.

The present invention will now be described more specifically with reference to the drawings attached as a way of example.

BRIEF DESCRIPTION OF THE ATTACHED DRAWINGS

DETAILED DESCRIPTION OF THE PREFERRED EMBODIMENT

In the following description, for purposes of explanation rather than limitation, specific details are set forth such as particular architecture, interfaces, techniques, etc., in order to provide a thorough understanding of the present invention. However, it will be apparent to those skilled in the art that the present invention may be practiced in other embodiments which depart from these specific details.

Figure 2:
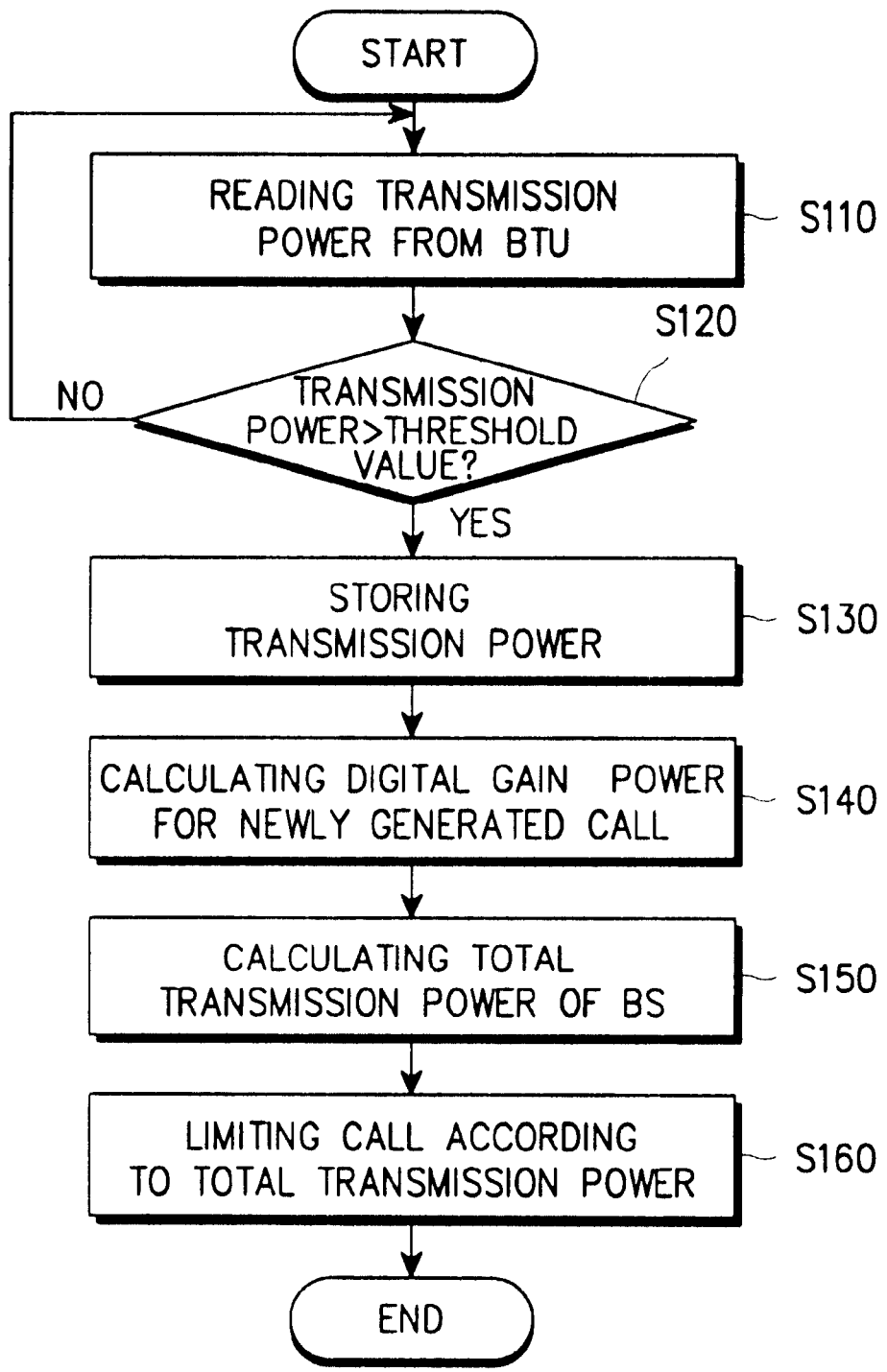
FIG. 2 is a flow chart for illustrating the steps of controlling the forward calls according to the embodiment of the present invention.

As depicted in FIG. 2, the method for controlling the forward calls according to the first embodiment includes the steps of: reading the transmission power of the BS measured by the BTU in step S110; comparing the transmission power with a first predetermined threshold value in step S120; storing the transmission power in step S130 if the transmission power is higher than a first predetermined threshold value; upon receiving a call, calculating the digital gain power of the call by using the digital gain assigned to the call in the BS in step S140; calculating the total transmission power of the BS of the call by adding the stored transmission power in step S130 to the calculated digital gain power in step S150; and, limiting the call in response to the determination of comparing the total transmission power with the second predetermined threshold value in step S160.

Figure 1:
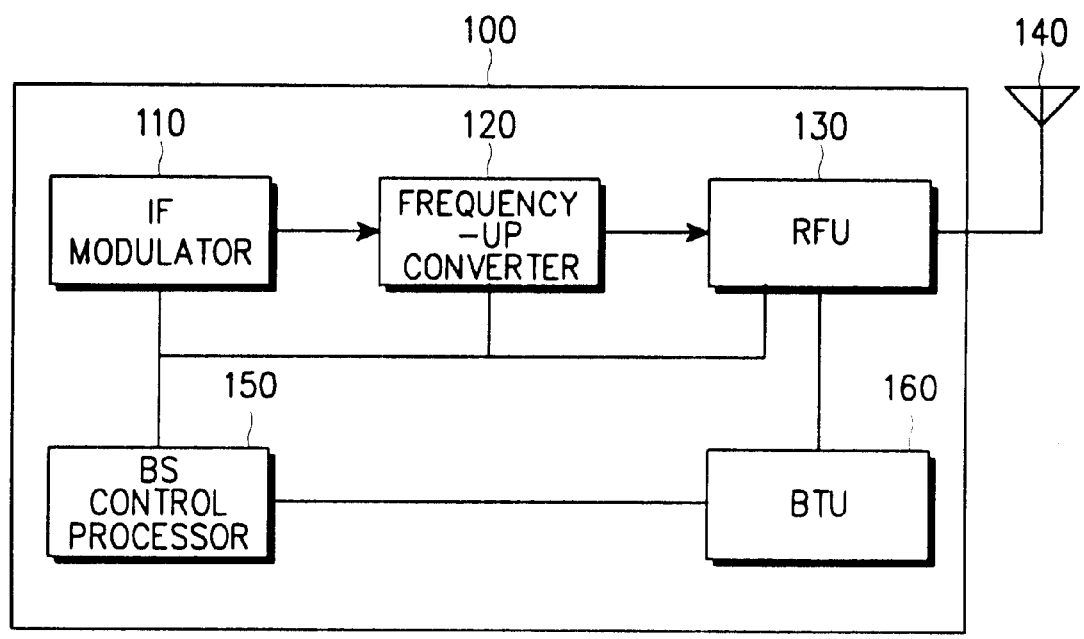
FIG. 1 is a block diagram for illustrating the forward signal path of the BS in a conventional mobile communication system.

A detailed description of the process for controlling the forward calls is made with FIG. 1, wherein the operator uses the base station manager (BSM) to remotely control a plurality of BSs. Initially, the operator sends a command signal to the BS control processor 150 to control the forward calls. In this case, if the BS provides a plurality of frequency channels and the service cell is divided into a plurality of sectors, each sector is defined as a sub-cell served by the frequency channels. For example, if the BS provides two frequency channels and the service cell is divided into three parts, the base station has six sub-cells (2×3). Each sub-cell can independently process a call so that the BSM and the BS control processor 150 directs the limitation of the forward calls of the BS to each sub-cell.

In step S110, upon receiving a command signal to control the forward calls from the BSM, the BS control processor 150 reads the transmission power of the BS measured by the BTU 160 in step S110 periodically, or at each request made by the BSM. In step S120, the BS control processor 150 compares the transmission power measured by the BTU 160 with a first predetermined threshold value lower than a second predetermined threshold value for limiting the forward calls. In step S130, the BS control processor 150 stores the measured transmission power if the transmission power is higher than the first predetermined threshold value.

Thereafter, if a call is generated to the BS, the BS control processor 150 calculates the digital gain power by using the digital gain (D/G) assigned to the call in step S140. To this end, the BS control processor 150 requests the D/G from the IF modulator 110 to compensate for the error of the digital gain power occurring in the radio frequency path consisting of the frequency-up converter 120 and RFU 130.

Meanwhile, the transmission power stored in step S130 is obtained just before the generation of the call to the base station. Hence, the stored transmission power of the BS is retrieved after the call generation, then the power (digital gain power) of the call is added to the retrieved transmission power. Thus, in step S150, the BS control processor 150 adds the digital gain power with the stored transmission power in step S130 to calculate the total transmission power of the BS after the generation of the call.

In step S160, the BS control processor 150 compares the total transmission power with a second predetermined threshold value, which is higher than the first predetermined value, to determine whether to limit the calls subsequently generated in the BS. Namely, if the total transmission power exceeds the second predetermined threshold value, the BS blocks all subsequent calls received thereon. If not, the BS processes all subsequent calls received thereon.

According to the embodiment of the present invention, the transmission power of the BS stored just prior the generation of a call is regarded as the "error power" occurring in the radio frequency path, which is usually stored in the BTU 160. Hence, the second embodiment of the present invention employs the error power stored in the BTU 160 to calculate the total transmission power of the BS.

Figure 3:
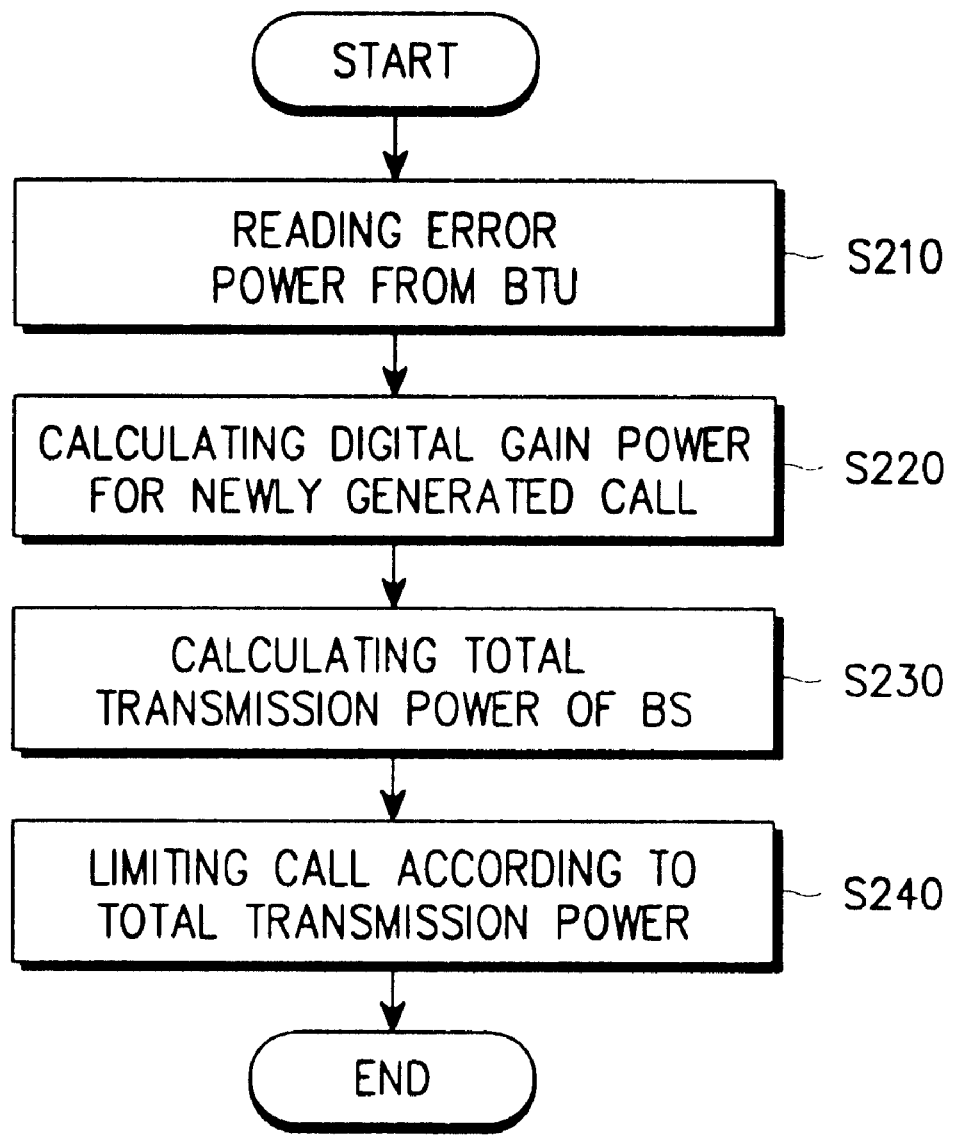
FIG. 3 is a flow chart for illustrating the steps of controlling the forward calls according to the embodiment of the present invention; and, FIG. 4 is a flow chart for illustrating the steps of specifically limiting the forward calls according to the present invention.

As illustrated in FIG. 3, the second embodiment includes the steps of: reading the error transmission power occurring in the radio frequency path from the BTU of the BS in step S210; calculating the digital gain power by using the digital gain assigned to a call in the BS in step S22; calculating the total transmission power of the BS of the call by adding the error transmission power to the digital gain power of the call in step S230; and, limiting the call in response to the determination of comparing the total transmission power with the second predetermined threshold value in step S240.

A detailed description of the second embodiment is illustrated in connection with FIG. 1. If the operator sends a command signal to the BS control processor 150 to control the forward calls for each sub-cell, the BS control processor 150 reads the error power stored in the BTU 160 periodically or at every request made by the BSM.

If a call is generated in the BS, the BS control processor 150 calculates the digital gain power by determining the D/G assigned to the call. To this end, the BS control processor 150 requests the D/G of the call from the IF modulator 110 to compensate for the error of the digital gain power occurring in the radio frequency path consisting of the frequency-up converter 120 and RFU 130.

In step S230, the BS control processor 150 adds the digital gain power to the error power read from the BTU 160 to calculate the total transmission power of the BS after the generation of the call. In step S240, it compares the total transmission power with a predetermined threshold value to limit the calls subsequently generated. Namely, if the total transmission power exceeds the predetermined threshold value, the BS blocks all subsequent calls generated thereon. If not, the BS control processor 150 allows all subsequent calls generated to the BS.

In the present invention, as the calls generated to the BS include newly generated calls and hand-off calls, the limitation of the calls must be carried out differently depending on the type of calls. The new calls are the origination calls requested by the MSs to the BS, and the termination calls are requested by the MSC to the BS. However, the hand-off call is generated when the MS connected to another BS moves into a new service area. For a mobile subscriber, it is more important to maintain the call connection of a roaming mobile phone than the new call originated by the non-roaming mobile phone. Hence, it is necessary to set two different threshold values in order to treat the new calls and the hand-off calls differently. To this end, the threshold value for limiting the hand-off call is set to be higher than that of the new calls.

Figure 4:
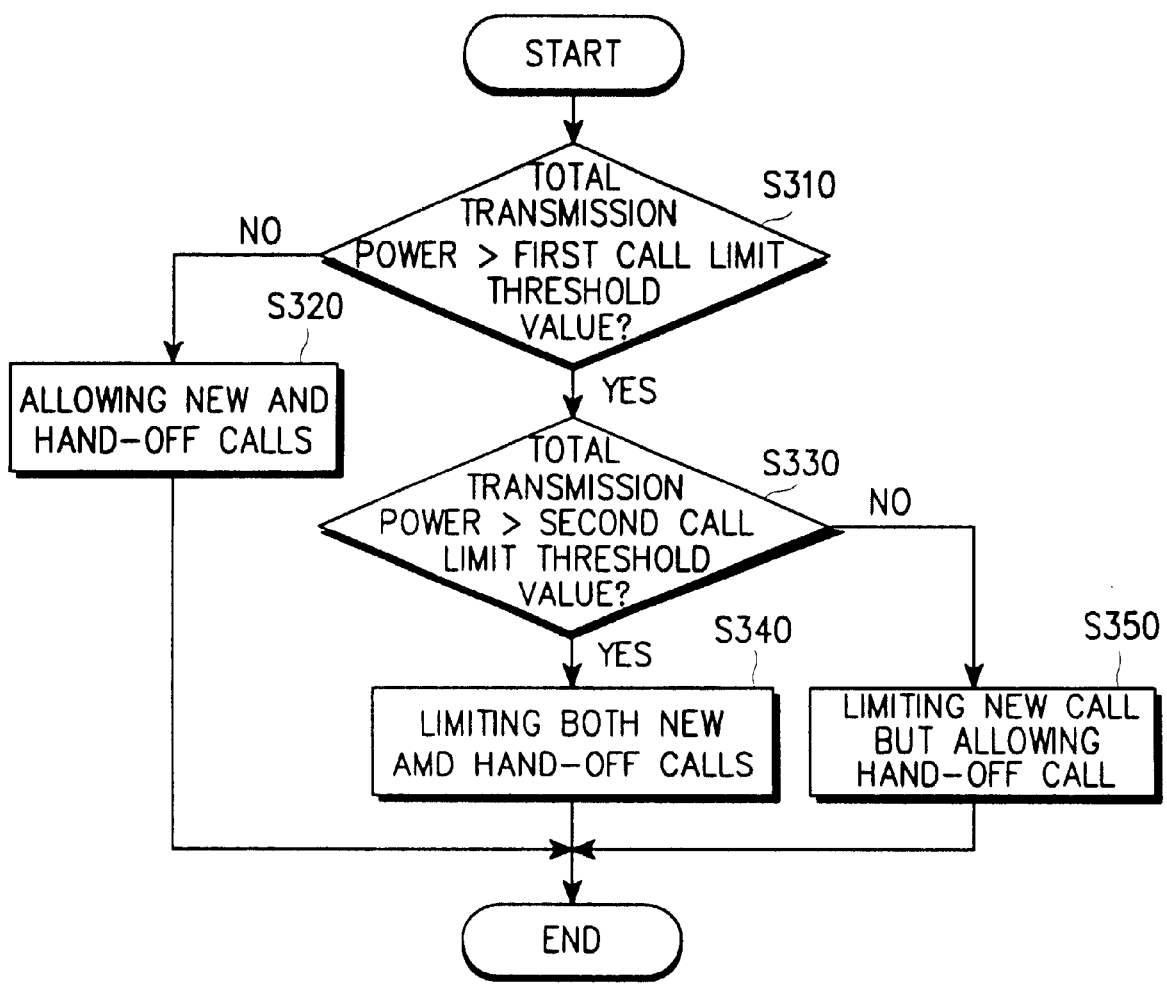

A detailed description of the steps of limiting the forward calls according to the type of calls is illustrated in connection with FIG. 4. The BS control processor compares the total transmission power obtained by the first or second embodiment with a "first call limit threshold value" for limiting a new call in step S310. If the total transmission power is not higher than the "first call limit threshold value," the BS control processor 150 allows all new and hand-off calls subsequently generated. However, if the total transmission power exceeds the "first call limit threshold value," the BS control processor 150 compares the total transmission power with a "second call limit threshold value" to determine whether to limit the hand-off call in step S330. If the total transmission power exceeds the "second call limit threshold value," the BS control processor 150 blocks both the new and the hand-off calls subsequently generated in step S340. However, if the total transmission power does not exceed the "second call limit threshold value," the BS control processor 150 blocks only the new calls but allows the hand-off calls subsequently generated in step S350.

As it is apparent from the foregoing, the present invention has an advantage in that the base station can determine a new total transmission power which compensates for the error associated in the prior art, thereby limiting the type of calls generated to the base station more accurately.

While the present invention has been described in connection with specific embodiments accompanied by the attached drawings, it will be readily apparent to those skilled in the art that various changes and modifications may be made thereto without departing from the gist of the present invention.

What is claimed is:

1. A method for controlling the forward calls in a cellular radio telecommunication system, comprising the steps of:

(a) reading a transmission power of a base station (BS) measured by a base station test unit (BTU);

(b) comparing said transmission power with a first predetermined value;

(c) storing said transmission power if said transmission power is higher than said first predetermined value;

(d) upon receiving a call in said base station, calculating a digital gain power based on a digital gain assigned to said call; and, (e) calculating a total transmission power of said BS according to said call by adding said read transmission power to said calculated digital gain power; and, (f) limiting said call in response to a determination of comparing said total transmission power with a second predetermined value.

2. The method as defined in claim 1, wherein the step (a) of reading said transmission power is performed periodically.

3. The method as defined in claim 1, wherein the step (a) of reading said transmission power is performed at each request by a subscriber.

4. The method as defined in claim 1, wherein the step (f) of limiting said call further comprises the steps of:

comparing said total transmission power with a first threshold value for limiting said call;

if said total transmission power is not higher than said first threshold value, allowing subsequent new calls and hand-off calls received in said base station;

if said total transmission power is higher than said first threshold value and if said total transmission power is higher than a second threshold value, blocking said new calls and said hand-off calls; and, if said total transmission power is higher than said first threshold value and if said total transmission power is lower than said second threshold value, blocking said new calls and allowing said hand-off calls.

5. The method as defined in claim 4, wherein said first threshold value is substantially less than said second threshold value.

6. The method as defined in claim 4, wherein, if said BS provides a plurality of frequencies and a service cell of said BS is divided into a plurality of sectors respectively served by said plurality of frequencies, said forward call control method is performed for each said sector by performing said steps (a), (b), (c), (d), (e), and (f) for each said sector.

7. The method as defined in claim 1, wherein said digital gain power of said call is calculated by measuring the digital gain power of an IF modulator for said call in said base station.

8. A method for predetermining the total transmission power of the BS in a mobile radio telecommunication system, comprising the steps of:

(a) reading the transmission power of a base station (BS) measured by a base station test unit (BTU);

(b) comparing said transmission power with a first predetermined threshold value;

(c) storing said transmission power if said transmission power is higher than said first predetermined threshold value;

(d) upon receiving a call in said base station, calculating a digital gain power based on a digital gain assigned to said call; and, (e) calculating said total transmission power of said BS responsive to said call by adding said read transmission power to said calculated digital gain power.

9. The method as defined in claim 8, wherein the step of reading said transmission power is performed periodically.

10. The method as defined in claim 8, wherein the step of reading said transmission power is performed at each request made by a subscriber.

11. The method as defined in claim 8, wherein said digital gain power of said call is calculated by measuring the digital gain power of an IF modulator for said call in said base station.

12. The method as defined in claim 9, wherein if said BS provides a plurality of frequencies and a service cell of said BS is divided into a plurality of sectors respectively served by said plurality of frequencies, determining said total transmission power for each said sector by performing said steps (a), (b), (c), (d), and (e) for each said sector.

13. The method as defined in claim 10, wherein if said BS provides a plurality of frequencies and a service cell of said BS is divided into a plurality of sectors respectively served by said plurality of frequencies, determining said total transmission power for each said sector by performing said steps (a), (b), (c), (d), and (e) for each said sector.

14. A method for controlling the forward calls in a cellular radio telecommunication system, comprising the steps of:

(a) reading an error power occurring in a radio frequency path by a base station test unit (BTU) of a base station;

(b) upon receiving a call to said base station, calculating a digital gain power of said call based on a digital gain assigned to said BS;

(c) calculating a total transmission power of said BS according to said call by adding said read transmission power to said calculated digital gain power; and, (d) limiting said call in response to a determination of comparing said total transmission power with a predetermined value.

15. The method as defined in claim 14, wherein the step of reading said error power is performed periodically.

16. The method as defined in claim 14, wherein the step of reading said transmission power is performed at every request by a subscriber.

17. The method as defined in claim 14, wherein said digital gain power of said call is calculated by measuring the digital gain power of an IF modulator for said call in said base station.

18. The method as defined in claim 15, wherein the step of limiting said call further comprises the steps of:

comparing said total transmission power with a first threshold value for limiting said call;

if said total transmission power is not higher than said first threshold value, allowing subsequent new calls and hand-off calls received in said base station;

if said total transmission power is higher than said first threshold value and if said total transmission power is higher than a second threshold value, blocking said new calls and said hand-off calls; and, if said total transmission power is higher than said first threshold value and if said total transmission power is lower than said second threshold value, blocking said new calls and allowing said hand-off calls.

19. The method as defined in claim 16, wherein the step of limiting said call further comprises the steps of:

comparing said total transmission power with a first threshold value for limiting said call;

if said total transmission power is not higher than said first threshold value, allowing subsequent new calls and hand-off calls received in said base station;

if said total transmission power is higher than said first threshold value and if said total transmission power is higher than a second threshold value, blocking said new calls and said hand-off calls; and, if said total transmission power is higher than said first threshold value and if said total transmission power is lower than said second threshold value, blocking said new calls and allowing said hand-off calls.

20. The method as defined in claim 19, wherein said first threshold value is substantially less than said second threshold value.

21. The method as defined in claim 20, wherein, if said BS provides a plurality of frequencies and a service cell of said BS is divided into a plurality of sectors respectively served by said plurality of frequencies, determining said total transmission power for each said sector by performing said steps (a), (b), (c), and (d) for each said sector.

22. A method for predetermining the total transmission power of a base station in a mobile radio telecommunication system, comprising the steps of:

(a) reading an error power occurring in a radio frequency path from a base station test unit of said base station;

(b) upon receiving a call to said base station, calculating a digital gain power based on a digital gain assigned to said call of said BS; and, (c) calculating said total transmission power of said BS according to said call by adding said read transmission power to said calculated digital gain power.

23. The method as defined in claim 22, wherein the step of reading said error power is performed periodically.

24. The method as defined in claim 22, wherein the step of reading said transmission power is performed at each request made by a subscriber.

25. A method as defined in claim 23, wherein if said BS provides a plurality of frequencies and a service cell of said BS is divided into a plurality of sectors respectively served by said plurality of frequencies, determining said total transmission power for each said sector by performing said steps (a), (b), and (c) for each said sector.

26. A method as defined in claim 24, wherein if said BS provides a plurality of frequencies and a service cell of said BS is divided into a plurality of sectors respectively served by said plurality of frequencies, determining said total transmission power for each said sector by performing said steps (a), (b), and (c) for each said sector.

\* \* \* \* \*